Nov. 7, 1939.   E. J. VON PEIN   2,178,768

AUTOGRAPH TIME RECORDER

Filed Sept. 15, 1938   5 Sheets-Sheet 1

INVENTOR
Edward J. Von Pein
BY
W. M. Wilson
ATTORNEY

Nov. 7, 1939.  E. J. VON PEIN  2,178,768
AUTOGRAPH TIME RECORDER
Filed Sept. 15, 1938   5 Sheets—Sheet 3

INVENTOR
Edward J. Von Pein
BY
W. Wilson
ATTORNEY

Nov. 7, 1939.   E. J. VON PEIN   2,178,768
AUTOGRAPH TIME RECORDER
Filed Sept. 15, 1938   5 Sheets-Sheet 4
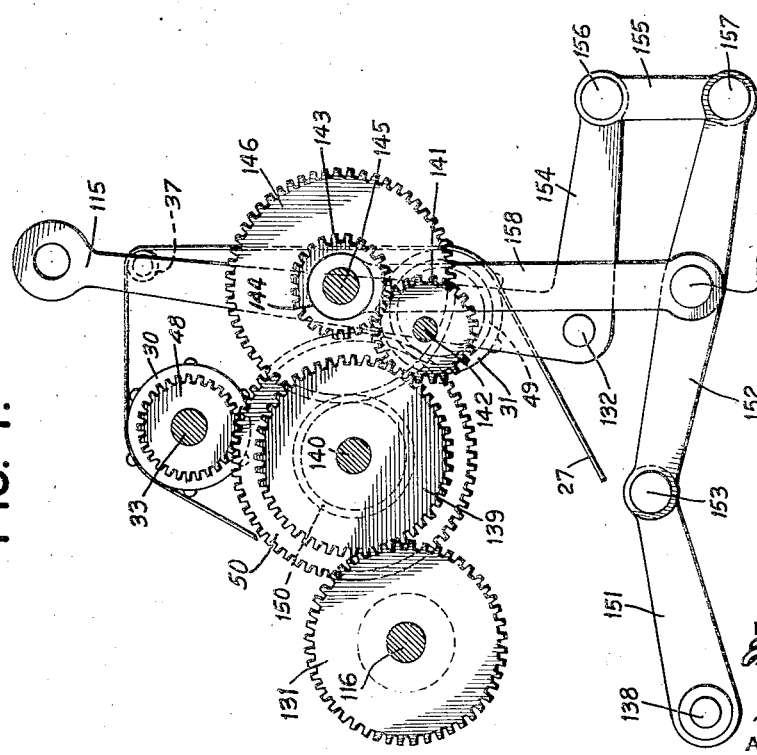
INVENTOR
Edward J. Von Pein
by
ATTORNEY

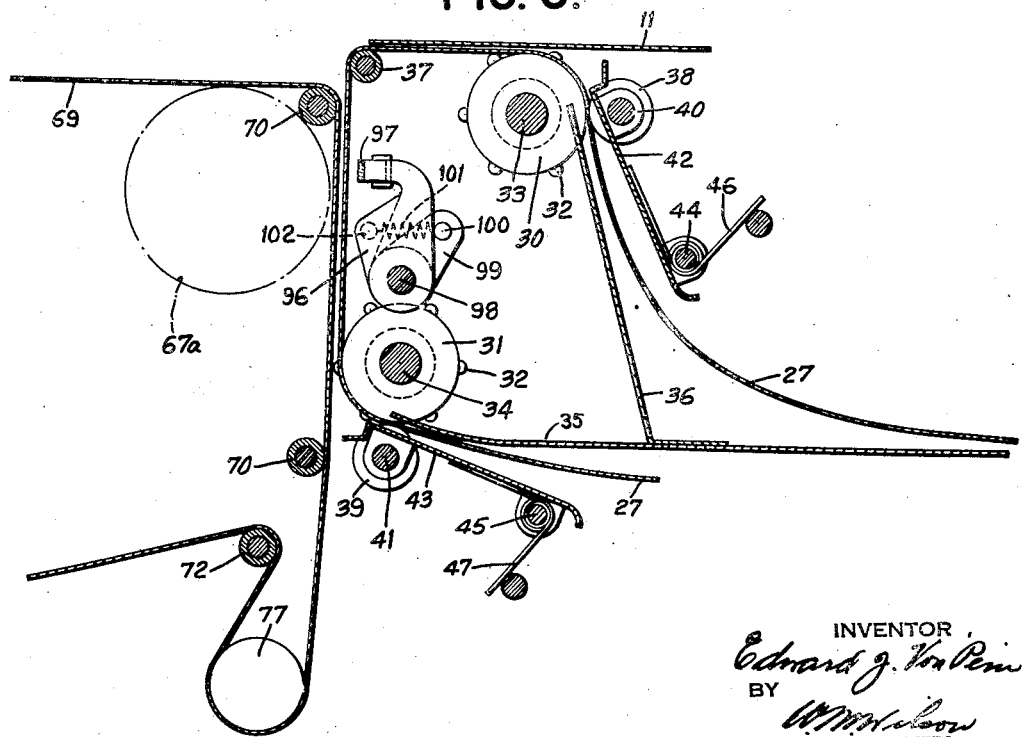

Patented Nov. 7, 1939

2,178,768

UNITED STATES PATENT OFFICE 2,178,768

AUTOGRAPH TIME RECORDER

Edward J. Von Pein, Endicott, N. Y., assignor to International Business Machines Corporation, New York, N. Y., a corporation of New York Application September 15, 1938, Serial No. 230,073

16 Claims. (Cl. 234—41)

This invention relates to a time recorder and more particularly to a machine of the type known as an autograph time recorder in which the person registering identifies himself by placing his signature within a given area of a record sheet adjacent the time record printed by the machine.

Autograph recorders in general use have the undesirable feature that the signatures and time records of any one employee are scattered through the record sheet in accordance with the chronological orders of arrivals and departures of the employees during the day. In other words, each time an individual registers, his registration will be placed on the record sheet directly after the last registration made on the machine regardless of when that registration was made or who made it. Although machines of this type are commonly used when the number of employees is small, say from 10 to 15, it is obvious that such a random occurrence of an individual's registration makes it more difficult to examine and analyze than if each individual's registration were grouped together in a single zone.

In accordance with the present invention, a recorder is provided in which all the registrations made by an individual will appear in an assigned zone on the record sheet. It is proposed to accomplish this result by rendering the record sheet responsive to three different movements. The hereinafter described machine provides two coacting differentials whereby all three movements may be transmitted to the sheet independently of each other. When using the machine incorporating the present invention, the operator will rotate a hand wheel backward or forward, as required, to move his assigned sheet zone into printing position. He then will move a lever to any one of several predetermined positions to move a selected portion of said zone into printing position. This lever is described as manually operated although it will become obvious that it could be operated by time controlled means if desired. Finally, the operator will depress an operating lever which will, in the order named, actuate the printing means, move the selected portion from printing position to one adjacent an aperture in the casing, and remove a shutter from said aperture to permit the operator to write his name on said sheet portion.

It is therefore an object of this invention to provide a time recorder having a record sheet which may be moved forward or backward to effect printing in selected zones.

Another object of this invention is to provide a time recording device for printing on a sheet selectively movable to locate different predetermined zones on said sheet in printing position in which the position of each registration within a selected zone may also be selected.

It is a further object of this invention to provide an autograph time recorder having means for selecting a sheet zone, additional means for selecting a portion within said zone to receive the record and means for effecting printing on said portion and thereafter moving it from printing position to a predetermined position for receiving a written record.

It is a still further object of the invention to provide a time recorder having record sheet positioning means including sprockets for driving the sheet and a differential for transmitting movements from two sources to the sprockets for actuating them, in which one of the sources is a manually actuated and the other is a second differential which in turn is actuated by two independently operated levers. Thus, the sheet will be positioned in accordance with the operations of the wheel and the two levers.

Further objects of the instant invention reside in any novel feature of construction or operation or novel combination of parts present in the embodiment of the invention described and shown in the accompanying drawings whether within or without the scope of the appended claims and irrespective of other specific statements as to the scope of the invention contained herein.

In the drawings:

Fig. 4 shows the gear and lever arrangement which positions the record sheet as seen prior to operation;

Fig. 5 is similar to Fig. 4 but shows the arrangement after operation;

Fig. 6 shows the relation and position of the parts used to guide the record sheet; and Fig. 7 shows a portion of a record sheet with registrations marked thereon.

Figure 1:
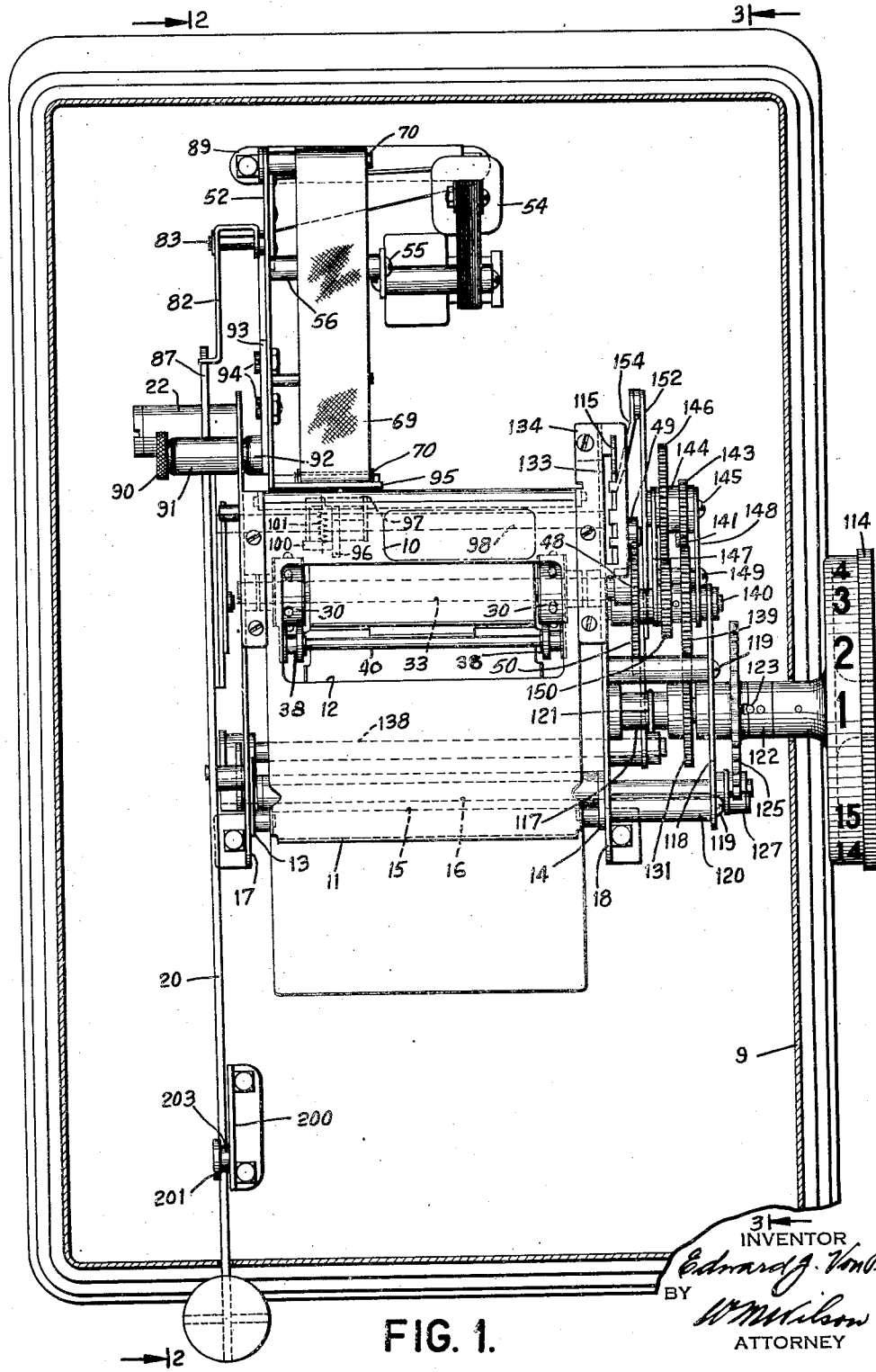
Fig. 1 is a plan view of the machine with the casing cut as at 1—1 in Fig. 2 and removed.
Figure 2:
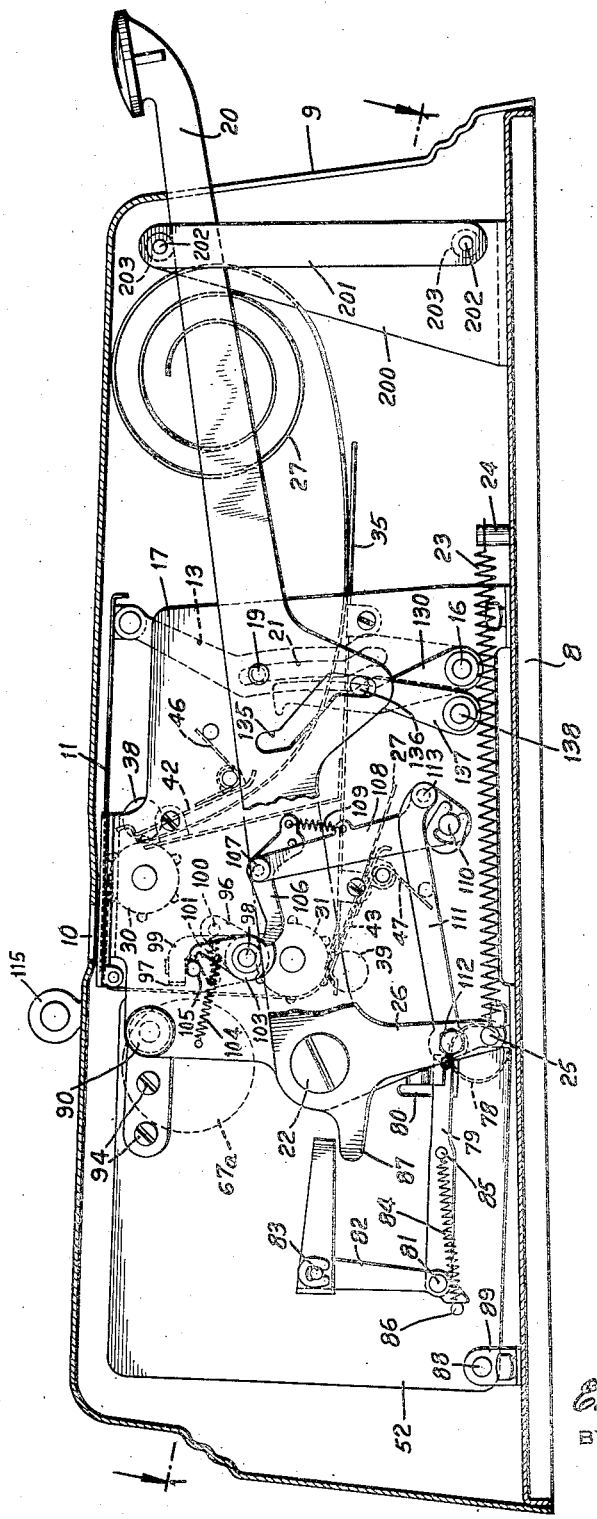
Fig. 2 is a side view taken along line 2—2 of Fig. 1 with certain parts broken away to show other parts.

As will be seen in Fig. 2, the machine is of the cabinet type with a base 8 and a casing 9. The top of casing 9 has an aperture 10 therein located as shown by the dot and dash lines in Fig. 1. Directly beneath and normally closing aperture 10 is a shutter 11 having an opening 12 therein. The shutter 11 is supported by two arms 13 and 14 which are rigidly secured to a tube 15 on shaft 16. The shaft 16 extends across the machine being journaled in frames 17 and 18 which are rigidly fixed on base 8. The tube 15 rides freely on shaft 16 and is movable independently thereof.

A pin 19 mounted on the side of operating lever 20 extends therefrom through a curved slot (not shown) in frame 17 and into a cam slot 21 in arm 13 (Fig. 2). Operating lever 20 extends outside of the casing and is designed to be manually pushed downward about its pivot 22 on frame 17. Spring 23 extends from pin 24 on base 8 to pin 25 mounted on arm 26 of lever 20 and serves to restore the lever to its upper position and normally maintain it there. Lever 20 is guided in its movement by a plate 200 mounted on base 8 and extending upward on one side of lever 20, and a bar 201 on the other side of lever 20 and attached to plate 200 by pins 202 carrying spacers 203 which also serve as upper and lower limit stops.

Because of the shape of cam slot 21 it is obvious that when lever 20 is depressed, it will act during the very last portion of its downward travel to move shutter 11 to the left as viewed in Fig. 2. Such movement of the shutter will bring its opening 12 beneath aperture 10 and expose a portion of the record sheet 27. As will be explained hereinafter, the portion of the record sheet thus exposed is that preselected portion upon which the operator desires to write his name.

The record sheet 27 has a series of spaced holes 28 aligned lengthways of the sheet near each margin as shown in Fig. 7. The sheet may have preprinted thereon any desired lines 29 as well as the words "In", "Out", "A. M." and "P. M." seen along the left margin, the illustrated data relative to the day and time to be printed by the machine. Two pairs of sprocket wheels, an upper 30 and a lower 31, (Figs. I and 6) carry projections 32 which fit into the spaced holes 28 to drive the sheet 27. Sprockets 30 are mounted on shaft 33 and sprockets 31 on shaft 34, both of these shafts being journaled in frames 17 and 18. A separator or guide member including two sections 35 and 36 is mounted between frames 17 and 18 and serves to keep the ends of record sheet 27 from becoming entangled with each other and with other parts of the machine. The path of the sheet 27 is from below guide 35 to sprockets 31, thence upwardly past the printing means (to be hereinafter described) over roller 37, mounted between frames 17 and 18, and horizontally beneath aperture 10 and shutter 11 to sprockets 30. From sprockets 30 the sheet goes downwardly and forwardly above guide sections 36 and 35. The sheet 27 is held in position on sprockets 30 and 31 by rollers 38 and 39, respectively, whose axles 40 and 41 are carried by levers 42 and 43 which are respectively pivoted at 44 and 45 between the side frames and biased toward their related sprockets by individual springs 46 and 47.

Figure 3:
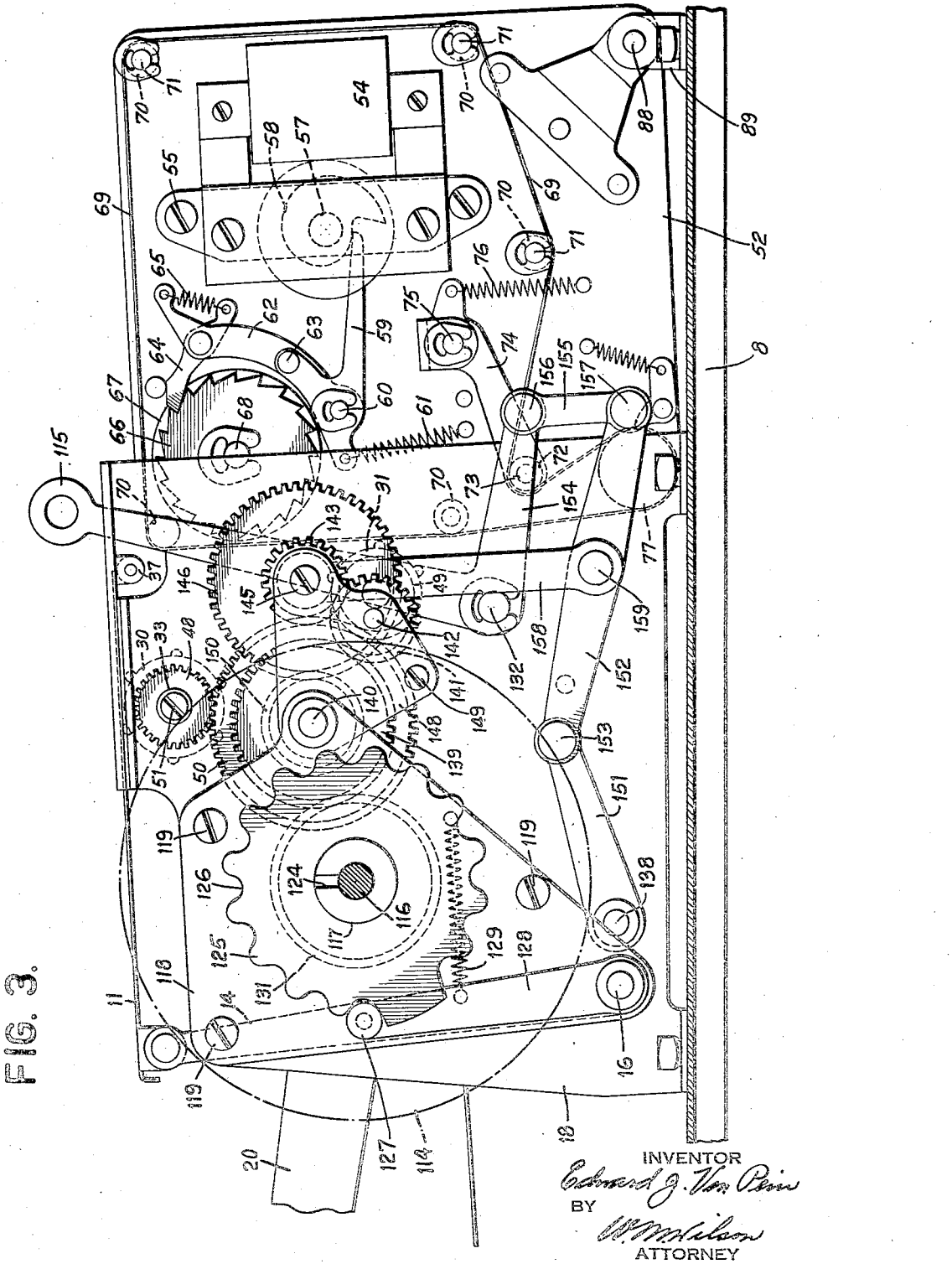
Fig. 3 is an elevation view taken along line 3—3 of Fig. 1.

On the right end of shaft 33, which carries sprockets 30, is mounted a gear 48 (Fig. 1). An identical gear 49 is mounted on the right end of shaft 34 which carries sprockets 31. Both gears 48 and 49 are engaged by the same gear 50 which drives them simultaneously to move the record sheet (Figs. 3, 4, and 5). Gears 48 and 49 are adjustably mounted on the ends of their respective shafts to permit adjustment of the sprockets relative to each other to obtain the proper amount of slack in the record sheet and to obtain the correct relation of the sheet to the printing line. Any of the well-known adjustable mountings may be used such as a threaded hole formed in the end of the shaft beyond a tapered hole therein, the shaft split and a tapered head screw 51 inserted to expand the shaft inside the gear.

At the rear of the machine proper is a type head composed largely of parts in common use in recorders. A side plate 52 has a suitable electric motor 54 fastened thereto by bolts 55 and held from the plate by spacers 56. The shaft 57 of the motor has fixed thereto a cam 58 (Fig. 3) making one revolution per minute and cooperating with a cam wiper 59 which is pivotally mounted on stud 60 fixed to the side plate 52. The cam wiper 59 is biased counterclockwise by spring 61 and is rigidly attached to a pawl arm 62 by means of a rivet 63, said pawl arm also being pivoted on stud 60. The pawl arm 62 carries a pawl 64 pivotally mounted thereon and biased in a counterclockwise direction by spring 65 to cooperate with a ratchet wheel 66 attached to a type wheel 67 and mounted on stud 68 fixed to the side plate. A plurality of type wheels positioned as at 67a (Fig. 6) are provided, each having a cooperating ratchet wheel and pawl for actuating same. These wheels constitute the day wheel, hour wheel, tens of minutes wheel, and the units of minutes wheel.

The carry-over or transfer from the units to the tens to the hour to the day wheel is accomplished in the well known manner, fully described in numerous patent disclosures such as, for example, Patent No. 771,494. As this method is old and well-known in the art and plays no part in the present invention, no further explanation is deemed necessary.

An endless ribbon 69 is provided which is carried across the face of the type wheels and around the timing unit on rollers 70, said rollers being supported by pins 71 fixed to the side plate. Tension is placed on the ribbon through roller 72 which is mounted on a pin 73 carried by lever 74. The lever 74 is pivoted on stud 75 carried by plate 52 and is biased in a clockwise direction by spring 76. The ribbon also passes over a driving roller 77 pivotally mounted on the side plate and provided with suitable absorbent material which may be impregnated with ink to keep the ribbon constantly supplied. This driving roller has fixed to it a ratchet wheel 78 (Fig. 2) cooperating with a pawl 79. The pawl 79 is on the opposite side of plate 52 from the ratchet wheel 78 but its right extremity extends through an opening 80 in the plate to engage the teeth of the ratchet. Pawl 79 is pivoted at 81 on bell crank lever 82 which in turn is pivoted on plate 52 at 83. A spring 84 extends between stud 85 on pawl 79 and stud 86 on plate 52 to bias the pawl in a clockwise direction against the ratchet 78 and to the left against stud 86 which acts as a stop. A projection 87 from lever 20 is positioned to engage bell crank lever 82 when lever 20 is depressed to cause pawl 79 to be moved to the right (Fig. 2) to engage another tooth on ratchet wheel 78. The return of lever 20 to its upper position permits spring 84 to pull pawl 79 to the left to advance the ribbon.

Side plate 52 is pivoted at 88 to brackets 89 fixed on base 8 but is normally held in the position illustrated by thumb screw 90 (Fig. 1). This screw 90 extends through a sleeve 91 fixed on frame 17 and into a nut 92 fixed on link 93 which is adjustably secured to plate 52 by bolts 94. Means (not shown) are provided in sleeve 91 to prevent screw 90 from falling out when it is screwed out of nut 92. The type head also carries a blur shield 95 between the ribbon 69 and the sheet 27 with a suitable opening directly in front of the type wheels.

A printing hammer 96 (Fig. 6) provided with a platen 97, is freely pivoted on a shaft 98 extending across the machine and journaled on frames 17 and 18. An arm 99 is fixed on shaft 98 and has a projection 100 against which the edge of hammer 96 rests inasmuch as spring 101 interconnects projection 100 and pin 102 on arm 96. A cam 103 (Fig. 2) is attached to the outer end of shaft 98 and is pulled counterclockwise by spring 104 against stop pin 105 on frame 17. A pawl 106 engages a notch in cam 103 and is pivoted at 107 on the upper end of lever 108, the pawl being held against said cam by spring 109. Lever 108 is pivoted at its lower end on stud 110 fixed on frame 17. A link 111 connects lever 108 and arm 26 of lever 20, being pivotally connected to arm 26 at 112 and to lever 108 at 113. Thus, when lever 20 is depressed, link 111 will rotate lever 108 counterclockwise, the pawl 106 turning cam 103 against its spring 104 to draw the hammer 96 clockwise. As the pawl passes on it releases the cam whose spring 104 quickly returns it to stop pin 105 where the shaft 98 is arrested. However, the spring 101 allows the hammer 96 to overthrow momentarily causing the print to be made. It will be readily understood that because of the high leverage on lever 108, the printing operation will occur during the very first part of the downward motion of operating lever 20 and that when lever 20 is again moved to its upper position by spring 23, the pawl 106 will be re-engaged with the notch in cam 103.

There are three different ways of turning the sprockets and moving the record sheet. First, the hand wheel 114 (Fig. 1) is employed to select the individual zone in which the registration is to be made. Second, the lever 115 is employed to select the desired position within the selected zone. Third, the operating lever 20 is used to effect movement of the record sheet from printing to writing position.

The hand wheel 114 is located on the side of the cabinet and is divided into sixteen equal parts, fifteen of which are numbered along the periphery of the wheel with the sixteenth space left blank. One of these numbers is assigned to each employee who, when registering, turns the wheel until his number is on top directly beneath a pointer (not shown).

A shaft 116 extends from wheel 114, whose position is shown by dot and dash lines in Fig. 3, through side of casing 9 into a sleeve 117 journaled in frame 18 and plate 118 which is rigidly secured to frame 18 by bolts 119 and spaced therefrom by spacers 120. Shaft 116 may be removably held in place in sleeve 117 by a spring lock clip 121 carried in a slot in the sleeve by any of the commonly used methods. For example, the shaft may be tapered on its inner end and have an annular groove a short distance from that end. Then as the shaft is pushed into the sleeve, the tapered end opens the spring clip which drops into the groove when the shaft is in place and tends to hold it there. A collar 122 is fixed to shaft 116 and has a key pin 123 fitting into keyway 124 (Fig. 3) in sleeve 117 in only one position of the shaft relative to the sleeve. It is to be noted here that suitable means, such as a pin on shaft 116 and a slot in casing 9 (not shown), are provided to prevent the hand wheel from being removed except in the number one position.

A locating disc 125 is mounted on sleeve 117 to be turned by handwheel 114. The disc 125 is also divided into 16 equal spaces corresponding to those on hand wheel 114 with one blank space and the other fifteen having notches such as at 126. A roller 127 is carried on arm 128 mounted on shaft 16 and biased toward disc 125 by spring 129. The roller cooperates with notches 126 to yieldably position the disc in its various positions, the blank space on disc 125 serving as a stop at the number one and number fifteen positions. A gear 131 is also mounted on sleeve 117 to be turned by hand wheel 114 to effect movement of the record sheet in a manner to be hereinafter explained.

As previously mentioned, shaft 16 which carries arm 128 extends across the machine. Mounted on the opposite end of this shaft from arm 128 is a locking arm 130 (Fig. 2). It is evident that as the roller 127 rides to the top of the teeth which form notches 126, the shaft 16 will be rotated clockwise as viewed in Fig. 2 which motion will be imparted to arm 130. Likewise, arm 130 will be in its extreme left or counterclockwise position when the roller is at the bottom of a notch. Pin 19 carried by lever 20 is of such size that during downward motion of lever 20, it will pass the top of arm 130 only if the latter is in its extreme left position. Thus, if the setting made with the hand wheel should leave the roller slightly out of the bottom of the selected notch, depression of lever 20 will act through pin 19 and arm 130 to cause the roller to seat in its notch bringing the mechanism to its exactly located point. If the hand wheel setting leaves the roller very far out of the bottom of the notch, the pin 19 will hit on top of arm 130 locking lever 20 in its upper position. This prevents printing of the time in the wrong place on the record sheet. It is also apparent that when lever 20 is depressed, pin 19 and arm 130 will cooperate to lock the hand wheel in place.

Lever 115 (Fig. 3) is a bell-crank pivoted on frame 18 at 132 with its longer arm extending upward through the top of casing 9. The upper end of lever 115 is designed to be moved manually back and forth in a slot in the casing and in a slot 133 (Fig. 1) in a bracket 134 secured on top of frame 18. Bracket 134 has a series of four notches located at equal distances along slot 133 for holding lever 115 in any one of four positions, which positions may correspond to "A. M. in", "A. M. out", "P. M. in", and "P. M. out" as the lever is moved from its top to its bottom positions as viewed in Fig. 1. The upper end of lever 115 is so shaped as to have a natural resiliency permitting movement in and out of the notches.

The operating lever 20 has a cam slot 135 therein, as shown in Fig. 2, through which projects a pin 136 carried on the end of arm 137 which is mounted on shaft 138. This shaft extends across the machine, being journaled in frames 17 and 18, and will be turned counterclockwise through the action of cam 135 on pin 136 when lever 20 is depressed. As explained before, the first part of the downward movement of lever 20 will operate the printing means and the last part will operate the shutter. Cam 135 is designed to rotate shaft 138 to effect movement of record sheet 27 after the printing operation and prior to the shutter operation.

In considering the three reasons and methods for moving the record sheet 27, it becomes apparent that each method must accomplish its own result independently of the other methods. Two coacting differentials are provided, linked together to permit the three separate actions to take place. One of these is a gear differential and one a lever differential and these will now be described.

The selection of the zone is the first movement given the record sheet 27. As can be seen in Fig. 7, movement of the sheet a distance of three sprocket holes 28 will move the sheet from one zone to the same position in the adjacent zone. Since there are six teeth on the sprockets 30 and 31, the required movement is 180 angular degrees thereof. This movement is to be accomplished by 1/16 of a revolution or 22½ angular degrees on hand wheel 114. As previously set forth, gear 131 is directly connected to the hand wheel and therefore in turning from number 1 to number 2 position will turn 22½ degrees counterclockwise (Figs. 3 and 4). In mesh with gear 131 is an equi-toothed gear 139 which turns on shaft 140 journaled in frames 18 and 118 but which is not fixed thereto. Gear 139 then turns 22½ degrees clockwise and is in mesh with gear 141 in a 2 to 1 tooth ratio so that the latter gear rotates 45° counterclockwise about its shaft 142. Gear 141 engages an equi-toothed gear 143 to turn the latter 45° clockwise about its hub 144 which turns freely on shaft 145 (Figs. 4 and 5) which is the stem of a bolt. A larger gear 146 is mounted on the same hub 144 and is thereby rotated 45° clockwise. Gears 141, 143 and 146 are mounted between two plates 147 and 148 forming a secondary frame in which shaft 142 is journaled. Plates 147 and 148 are separated by spacers but rigidly held together by bolts 149 and 145 and pivoted on shaft 140. Thus, shafts 142 and 145 and their gears 141, 143 and 146 constitute a gear differential which may be rotated bodily about pivot 140.

Gear 146 is in mesh with a smaller gear 158 in a 2 to 1 tooth ratio to rotate the latter 90 degrees counterclockwise about shaft 140 to which it is fixed. Gear 50 is also fixed to shaft 140 and engages sprocket gears 48 and 49 in a 2 to 1 tooth ratio to rotate them 180° clockwise as desired.

Obviously the number of degrees and direction of rotation of the gears will be altered from that described in accordance with the number of the starting zone and that of the desired zone but the relationship of the gears will result in the proper operation.

The next movement of the record sheet is to the selected position within the desired zone and is accomplished by moving lever 115. However, for the present, it shall be assumed that the position selection has been made and the desired portion of the record sheet is in printing position. Lever 20 is then depressed to first effect printing and then to move that portion of the record sheet to a point directly beneath aperture 19. The machine is so designed that a rotation of the sprockets through 180 degrees will move the sheet the desired amount.

Immediately after the printing operation, arm 137 (Fig. 2) will be moved to rotate shaft 138 in a clockwise direction as viewed in Fig. 3. Such rotation of shaft 138 will move arm 151 which is secured thereto from the position shown in Fig. 4 to that shown in Fig. 5. The movable end of arm 151 is pivotally attached to differential lever 152 at 153. The other end of lever 152 is connected to the short arm 154 of lever 115 by link 155 which is pivotally attached to said arm and lever at 156 and 157, respectively. End 157 of lever 152 will therefore remain stationary as long as lever 115 is locked in its selected position. A link 158 is pivoted at the center 159 of lever 152 and connects same to shaft 145 mounted on plates 147 and 148. Thus, when arm 151 is moved from the position shown in Fig. 4 to that of Fig. 5, the differential lever 152 will act through link 158 to move the gear differential clockwise about shaft 140 for 18 angular degrees, the amount determined by the shape of cam slot 135.

In describing the individual gear movements resulting from movement of the gear differential about shaft 140, the movement of gear 150 will be considered in two parts for clarity although both movements occur simultaneously.

When the gear differential is moved 18 degrees about shaft 140, gear 139 is held stationary through gear 131, disc 125 and roller 127 as previously explained. Therefore, gear 141 will roll around 139 for 18 degrees and will rotate itself 36 degrees in a clockwise direction. Gears 143 and 146 will then be turned an equal number of degrees counterclockwise.ABear 146 meshes with gear 150 to rotate it 72 degrees clockwise. This part of the movement has resulted from the movement of shaft 145 about gear 139.

Now an additional movement is gained by virtue of the movement of shaft 145 about gear 150. This latter movement is the same as would be obtained if gear 141 was not in mesh with 139 and was locked together with gear 143 while the differential was moved 18 degrees clockwise about the center of gear 150. In other words the first described movement of the teeth of gear 146 is caused by the movement of the teeth in gears 143 and 141, but in addition gear 146 is bodily moved 18 degrees about gear 150 to rotate same an additional 18 degrees clockwise. Thus, the total rotation of gear 150 is equal to the sum of these two movements or 90 degrees clockwise. This rotation is transferred through gear 50 to sprocket gears 48 and 49 resulting in 180 degrees counterclockwise rotation thereof which will just move the record sheet from the printing to the autographing position.

It is apparent that each time lever 20 is depressed, the gear differential will be turned 18 degrees on shaft 140 regardless of the relative position of end 157 of differential lever 152. End 157 is movable by lever 115 prior to the printing operation to select the registration position within the desired zone. Since 180 degrees rotation of the sprockets moved the record sheet a total of four positions and was accomplished by an 18 degree movement of the gear differential, movement from one position to an adjacent one will require 45 degrees sprocket rotation or 4½ degrees gear differential movement. The notches in bracket 134 are spaced to result in raising or lowering point 157 sufficiently to rotate the gear differential 4½ degrees about shaft 140 in moving lever 115 from one notch to the next one.

For the purpose of explanation, let it be assumed that lever 115 is moved one notch to the left as viewed in Fig. 4. End 157 of lever 152 will be raised sufficiently to cause the gear differential to be rotated 4½ degrees counterclockwise about shaft 140. Gear 141 then rolls along 4½ degrees of temporarily stationary gear 139 and turns itself 9 degrees counterclockwise. Gear 143 is then rotated an equal number of degrees clockwise as is gear 146. Gear 150, in mesh with gear 146, is thereby turned 18 degrees counterclockwise. An additional 4½ degrees of counterclockwise rotation is given to gear 150 by virtue of the movement of shaft 145 about gear 150, as explained previously. Thus, gear 150 is rotated a total of 22½ degrees counterclockwise. Gear 50 is turned an equal amount to rotate gears 48 and 49 and their sprockets 45 degrees clockwise, the desired amount.

Briefly, the operation of the machine is as follows: The employee turns the hand wheel 114 backward or forward to his assigned number which results in movement of the assigned zone on the record sheet to in front of the type wheels. He then moves lever 115 forward or backward to the desired notch which results in movement of the selected line on the record sheet within the selected zone to printing position. The operating lever 20 is then depressed resulting in three operations in sequence. First the time is printed. Then the sheet is moved to bring the selected line beneath aperture 10 and lastly, the shutter is moved exposing that line of the record sheet. The lever 20 is manually held down while the employee writes his name on the exposed portion of the record sheet. Release of lever 20 closes the shutter, returns the record sheet to its position prior to the depressing of lever 20 and re-latches the printing hammer.

When a record sheet is complete after a day's registration, it is removed and a new sheet inserted. To remove the record sheet, hand wheel 114 is turned to its number one position. At this position, it will be recalled, the wheel can be pulled out of casing 9. The casing may then be unlocked and removed. Thumb screw 90 is loosened and the type head thrown back. Shutter 11 is lifted manually, roller supports 42 and 43 lifted or depressed as the case might be, and the record sheet removed. The new sheet is inserted and since the mechanism will always be at the same zone setting, the sheet may have a mark thereon corresponding to a mark on the sprockets to insure proper threading of the sheet.

Although the machine illustrated includes a manual lever for selecting the registration position within each zone, it is sometimes desirable that this be done automatically in accordance with the time of registration. It is obvious that such automatic selection may be easily accomplished by positioning end 157 of lever 152 by means of a time controlled program wheel or other well-known time controlled movements.

While there has been shown and described and pointed out the fundamental novel features of the invention as applied to a single modification, it will be understood that various omissions and substitutions and changes in the form and details of the device illustrated and in its operation may be made by those skilled in the art without departing from the spirit of the invention. It is the intention, therefore, to be limited only as indicated by the scope of the following claims.

What is claimed is:

1. In a time recorder, record printing means, a record sheet, sheet driving means adapted to move the sheet in either of two opposite directions, means for selectively actuating said driving means various predetermined amounts in the suitable one of said directions to move a desired sheet zone into printing position, and means for independently and selectively actuating said driving means various predetermined smaller amounts in the suitable one of said directions to position a selected portion of said zone to receive a printed record.

2. In a time recorder, record printing means, a record sheet having a series of holes therein, sprocket wheels having teeth for insertion into said holes whereby rotation of the wheels will move the sheet, driving means for rotating said wheels, manual means for selectively actuating said driving means any one of a plurality of predetermined amounts to move a desired sheet zone into printing position, and means for independently and selectively actuating said driving means any one of a plurality of predetermined smaller amounts to move a selected portion of said zone into printing position.

3. A time recorder including a record sheet for receiving both a printed and a written record at each recording, a casing having an aperture adjacent said sheet, record printing means, sheet engaging means for moving the sheet, driving means for said engaging means, a plurality of means for independently and selectively actuating said driving means various amounts to move a selected portion of the sheet into printing position, and an operating lever for operating said printing means and thereafter actuating said driving means a predetermined amount to move said selected portion from printing position to one adjacent said aperture, whereby a written record may be placed on said portion through the aperture.

4. In a time recorder including a record sheet, sheet positioning means comprising means for driving the sheet, a differential for transmitting movements from two sources to said driving means, manually actuated means for producing one source of movement, a second differential for producing the other source of movement, and a plurality of independently operated means for actuating said second differential, whereby said sheet will be positioned in accordance with the operation of said manual means and said plurality of means.

5. A time recorder including record printing means, a record sheet, a casing having an aperture adjacent the sheet, means for driving said sheet, a differential for transmitting movements from two sources to said driving means, manually actuated means for producing one source of movement, said means being selectively operable to move a selected sheet zone to printing position, a second differential for producing the other source of movement, means for selectively actuating said second differential to move a desired portion of said zone into printing position, and a manually operated lever for effecting operation of said printing means and thereafter actuating said second differential to move said sheet portion from printing position to one adjacent said aperture.

6. In a time recorder including a record sheet, means for moving said sheet, a gear train for actuating said means, manual means for driving said gear train, said train including a gear differential constantly enmeshed in said train but bodily movable relative to the remainder thereof, and means for bodily moving said differential, whereby the position of the sheet will depend upon the combined effects of said manual means and said differential moving means upon said sheet moving means.

7. In a time recorder including a record sheet having a series of holes therein, sheet positioning mechanism comprising sprocket wheels having teeth for insertion in said holes to drive the sheet, means for actuating said wheels including a gear, a second gear rotatable at will, a gear differential interconnecting said first and second gears, said differential being bodily movable relative to said gears but constantly enmeshed therewith, and means for bodily moving said differential, whereby the position of the sheet will result from the combination of said second gear rotation and said differential movement.

8. In a time recorder including record printing means, a record receiving sheet, sheet driving means including a gear, a second gear, a gear differential interposed between and having constant engagement with said first and second gears, means for rotating said second gear to various selective positions to move a desired sheet zone into printing position, a movable support for said differential, means for latching said second gear in its selected position, whereby movement of said support will act through the differential to operate said driving means, and means for selectively moving said support a variable amount to move a selected portion of said sheet zone into printing position.

9. A time recorder including a record receiving sheet, a casing having an aperture adjacent said sheet, record printing means, sheet positioning mechanism including a gear train and manual means engaged therewith for driving same, said manual means being settable in various selective positions to move a desired portion of said sheet into printing position, means for latching said manual means in its selected position, said gear train including a gear differential arranged to be constantly enmeshed in said train, a movable support for said differential, whereby movement of the support will effect movement of said sheet, and an operating lever for initiating printing and thereafter moving said support to move said desired portion from printing position to a point adjacent said aperture.

10. In a time recorder including a record sheet, a supporting frame, sheet moving means, a gear for driving said means, a second gear rotatable at will, a secondary frame, said first and second gears and secondary frame being pivotally mounted independently on the same axis on said supporting frame, a gear differential carried by said secondary frame to interconnect said first and second gears and arranged to have constant engagement therewith, and means for moving said secondary frame about its pivot, whereby said differential will be bodily moved relative to said gears and the position of the sheet will depend upon the combined effects of said second gear rotation and said differential movement.

11. A time recorder including record printing means, a record receiving sheet, a casing having an aperture adjacent said sheet, a supporting frame, sheet driving means including a gear, a second gear, a secondary frame, said first and second gears and secondary frame being pivotally mounted independently on the same axis on said supporting frame, a gear differential carried by said secondary frame and having continual engagement with said gears to interconnect same, means for rotating said second gear to various selective positions to move a desired portion of said sheet into printing position, means for latching said second gear in its selected position, and an operating lever for initiating printing and thereafter rotating said secondary frame and gear differential to actuate said first gear and thereby move said portion from printing position to one adjacent said aperture.

12. A time recorder including record printing means, a record receiving sheet, a casing having an aperture adjacent said sheet, sheet moving means, a gear train for actuating said means, gear train driving means settable to various selective positions to move a desired sheet zone into printing position, means for latching said driving means in its selected position, said gear train including a gear differential arranged to be constantly enmeshed in said train but bodily movable relative to the remainder thereof to effect sheet movement, means for bodily moving said differential, means for actuating said latter means a selected amount to move a selected portion of said sheet zone into printing position, and an operating lever for initiating printing and thereafter actuating said differential moving means a predetermined amount to move said selected portion from printing position to one adjacent said aperture.

13. In a time recorder including a record sheet, means for moving said sheet, a gear train for actuating said means, manual means for driving said gear train at will, said gear train including a gear differential constantly enmeshed in said train but bodily movable relative to the remainder thereof, a lever differential connected to said gear differential for bodily moving same, and a plurality of independently operated means for actuating said lever differential, whereby the position of said sheet will depend upon the combined effects of said driving means and said plurality of independent means.

14. In a time recorder including a record sheet, means for moving said sheet, a gear train for actuating said means, manual means for driving said gear train at will, said train including a gear differential constantly enmeshed in said train but bodily movable relative to the remainder thereof, a lever, a link connecting said differential to said lever intermediate the ends thereof, means connected with one end of said lever to actuate same and move said differential, and means operable independently of said last mentioned means and arranged to actuate the other end of said lever.

15. In a time recorder including a record sheet, a supporting frame, means for moving said sheet, a gear for driving said means, a second gear rotatable at will, a secondary frame, said first and second gears and said secondary frame being pivotally mounted independently on the same axis on said supporting frame, a gear differential carried by said secondary frame and having constant engagement with said first and second gears to interconnect same, a lever, a link connecting said frame to said lever intermediate the ends thereof, whereby movement of said lever will rotate said secondary frame and act through said differential to rotate said first gear, means connected with one end of said lever to actuate it, and means operable independently of said last mentioned means and arranged to actuate the other end of said lever.

16. A time recorder including record printing means, a record receiving sheet, a casing having an aperture adjacent said sheet, means for moving said sheet, a gear train for actuating said means, manual means engaged with said gear train and settable in various selective positions to move a desired sheet zone into printing position, means for latching said manual means in its selected position, said gear train including a gear differential constantly enmeshed in said train but bodily movable relative to the remainder thereof, a lever connected intermediate its ends to said differential to bodily move same to effect sheet movement, means connected with one end of said lever to selectively actuate the lever in variable amounts to move a selected portion of said zone into printing position, means for latching said last mentioned means in place, and an operating lever for initiating printing and connected with the other end of said differential moving lever to thereafter actuate said other end to move said selected portion from printing position to one adjacent said aperture.

EDWARD J. VON PEIN.